J. A. McCASKELL.
CONTINUOUS PRESSURE FILTERING PROCESS AND APPARATUS.
APPLICATION FILED MAY 1, 1917.

1,288,433.

Patented Dec. 17, 1918.
2 SHEETS—SHEET 1.

Inventor
Jasper A. McCaskell
By
J. Walter Fowler
Attorney

J. A. McCASKELL.
CONTINUOUS PRESSURE FILTERING PROCESS AND APPARATUS.
APPLICATION FILED MAY 1, 1917.

1,288,433. Patented Dec. 17, 1918.
2 SHEETS—SHEET 2.

Inventor
Jasper A. McCaskell,
By T. Walter Fowler
Attorney

UNITED STATES PATENT OFFICE.

JASPER A. McCASKELL, OF SALT LAKE CITY, UTAH.

CONTINUOUS-PRESSURE FILTERING PROCESS AND APPARATUS.

1,288,433.

Specification of Letters Patent. Patented Dec. 17, 1918.

Application filed May 1, 1917. Serial No. 165,750.

*To all whom it may concern:*

Be it known that I, JASPER A. McCASKELL, a citizen of the United States, residing at Salt Lake City, in the county of Salt Lake and State of Utah, have invented certain new and useful Improvements in Continuous-Pressure Filtering Processes and Apparatus, of which the following is a specification.

My invention relates to a process and to an apparatus which may be employed, for instance, for continuously separating slimes from which precious metals have been dissolved and the liquid which holds the precious metals in solution. In the cyanid process, for example, when gold or silver bearing slimes are mixed or brought into contact with the cyanid solution, the precious metals are dissolved and carried in the liquid in a state of solution. To effect the separation of the metal-laden solution from the solid matter; by means of an improved filtering apparatus, of the rotary pressure type, is an essential object of the present invention.

While my invention is particularly useful for metallurgical work, it is not, however, to be understood that it is limited to such use, since it may be successfully employed in other fields and substantially wherever the separation of solids from liquid is desired. I wish to state, therefore, that the continuous pressure filter apparatus and the continuous filtering process which I am about to describe, are capable of almost universal use in the art of filtration, and hence I design to employ them not only in the filtration of mineral-bearing slimes and the like, but also for filtering saccharine solutions, chemicals, and in whatever field it is purposed to continuously separate a liquid from a solid and to continuously discharge the solid matter which has accumulated on the outside of the filtering medium during the filtering process.

With the above and other objects in view my invention consists of the parts, and the constructions, arrangements and combinations of parts which I will hereinafter describe and claim.

In the accompanying drawings forming part of this specification—

In carrying out my invention, I may employ the active filtering agent or agents in connection with an appropriate shell or casing, 1, of any suitable character and dimensions, and which, in the present case, is of a cylindrical pressure-filtrate type, namely, a shell or casing of such construction that it will readily resist the internal pressures to which it is subjected, during the filtering functions, said shell having in its lower portion a suitable inlet, 2, by which the material to be filtered is substantially continuously admitted to the interior of the shell, and in which shell this material rises until a substantial part of the lower portion of the hereinafter described filtering agent will be submerged. The delivery of the solution into the shell may be regulated and maintained in some appropriate manner.

Figure 4:
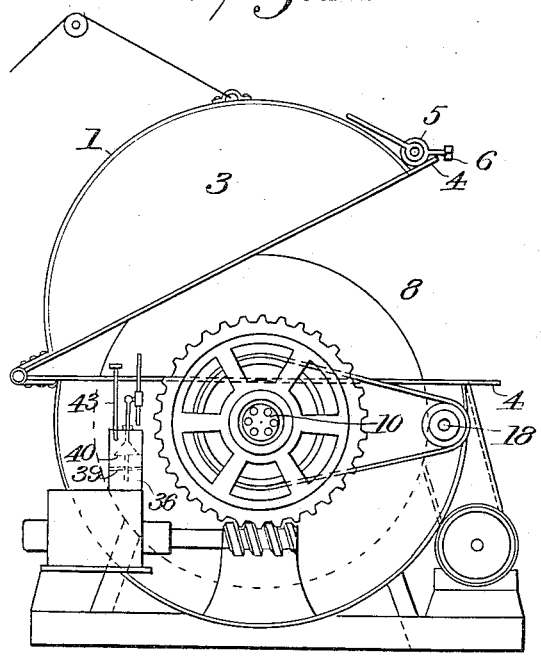
Fig. 4 is an end elevation, showing the upper section of the casing or shell elevated.
Figure 8:
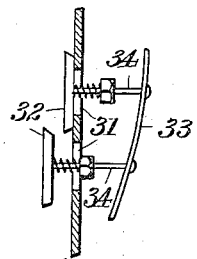
Fig. 8 is a sectional detail showing valves for closing the filtrate passages in the shaft.

In order that there may be ready access to the interior of the shell, and that the filtering agent may be exposed for any desired purpose, I prefer to construct the casing or shell of two parts, the upper part or section, 3, being hinged along one of its longitudinal edges, or otherwise, to a corresponding part of the lower section or portion of the shell or casing, said sections of the shell or casing having flanges, 4, for employment with a suitable locking mechanism, which in the present case is shown as comprising a locking cam, 5, and a headed bolt, 6, connected thereto, and a lever arm, 7, so connected to the cam that when the bolt is in engagement with the respective flanges of the casing, and the cam is rocked about its center, the two flanged portions of the casing will be brought into intimate locking engagement and will be appropriately secured. Although I have described one form of locking mechanism for the purpose stated, I wish it to be understood that I do not limit the salient features of my invention thereto, but that I may use any appropriate and well known mechanism which will serve the desired object, it being understood that the essential purpose of the said mechanism is to tightly close the sections one on the other, and hold them thus closed during the filtering function; to this end, said mechanism should be of such character as to also effect a ready disengagement of the sections to permit the upper section to be swung upwardly about its hinged joint to thereby expose the upper projecting portions of the interior filtering agent, which are carried in the lower section of the shell, as shown in Fig. 4.

Figure 1:
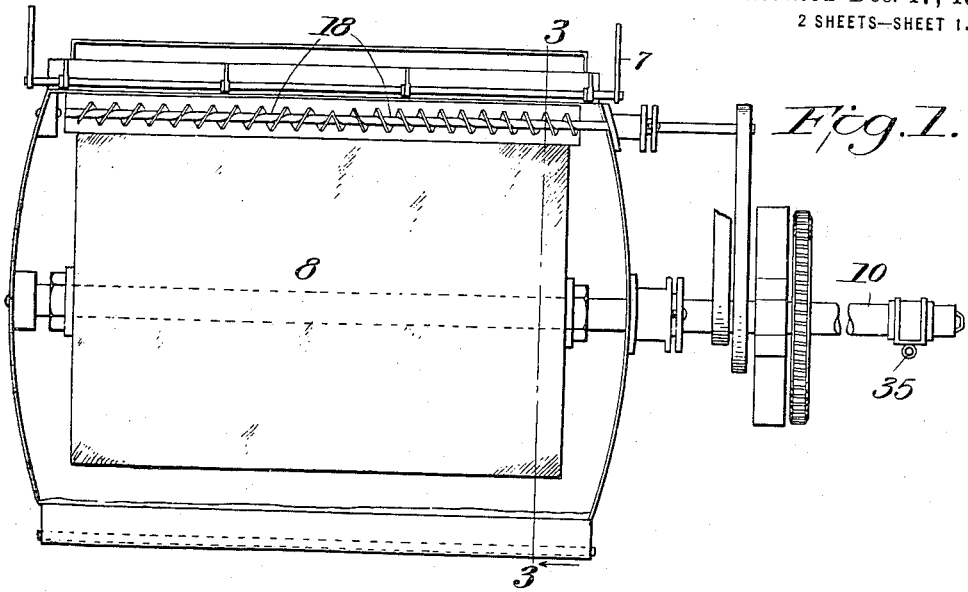
Figure 1 is a plan view of a filtering apparatus embodying my invention, showing the upper portion of the same removed.
Figure 2:
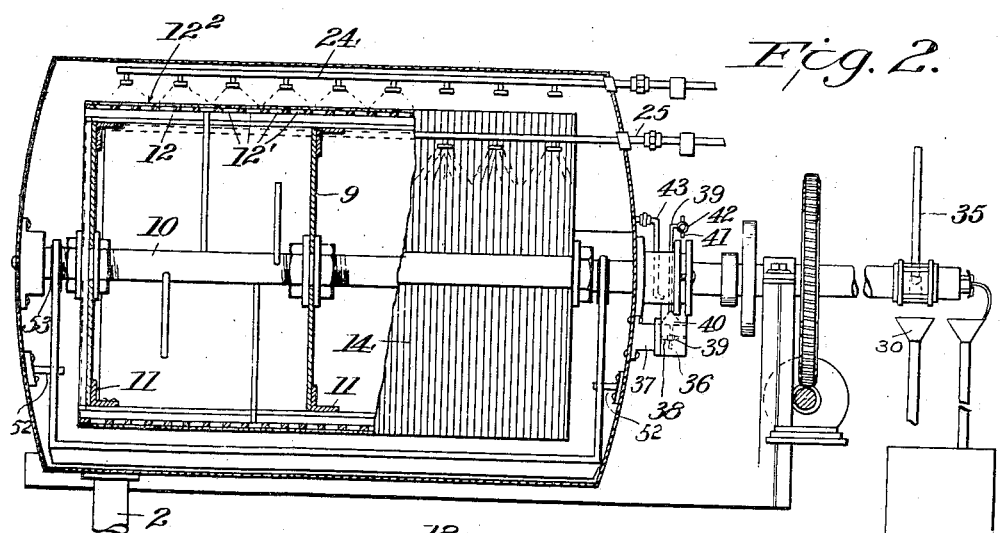
Fig. 2 is a vertical sectional view of the same, showing parts in elevation.

In a companion application filed of even date herewith, I have disclosed a similar casing and locking mechanism in connection with a pressure-filter employing a central rotatable shaft and a series of circular filter leaves fixed thereto in spaced relation, said leaves and the shaft being provided with connecting passages by which liquid filtrate passing to the interior of the filter leaves will be discharged into the passages of the shaft and will be finally delivered outside of the shell or casing. In the present instance I have shown a filtering agent as being in the form of a drum of such diameter than it occupies a large portion of the interior of the shell or casing, said drum, 8, comprising end heads and an intermediate spider, 9, fixed to the central revoluble shaft, 10, said heads and spider having their outer portions riveted or otherwise securely fixed to angle-iron brackets or flanges, 11, extending circumferentially around the inner periphery of the drum; said drum also comprising longitudinally-extending staves or strips, 12, in edgewise abutting relation, and other longitudinally-extending strips 13, spaced from each other around the surface formed by the first-named strips to form filtrate chambers, 12′, over which is passed a fabric or other filtering medium, 12², and which becomes the active filtering surface and which fabric or medium may be appropriately retained in place by a wrapping of fine wire, 14, as shown in Fig. 2.

The drum is appropriately secured to the rotatable shaft, 10, and said shaft is formed with longitudinally-extending passages, 15, these passages connecting laterally with the inner ends of suitable pipes 16 which extend radially from the shaft and have their outer ends in open connection with the filtrate chamber formed beneath the filtering surface or fabric, 12², before mentioned, whereby liquid filtrate upon being forced through the fabric or filtering surface by the pressure within the shell, 1, will be delivered into said chamber and will then be admitted by the pipes, 16, to the several passages which are formed lengthwise through the drum-supporting shaft, 10.

Figure 7:
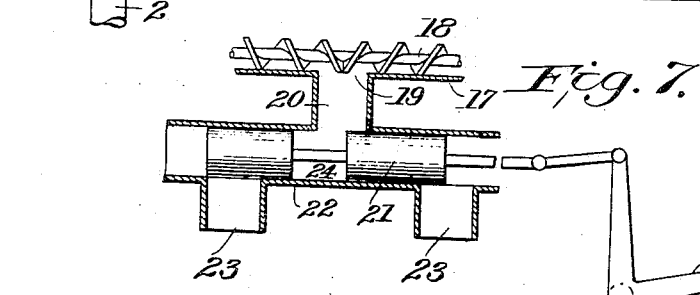
Fig. 7 is a longitudinal sectional view of a solids discharging device and coacting parts.
Figure 3:
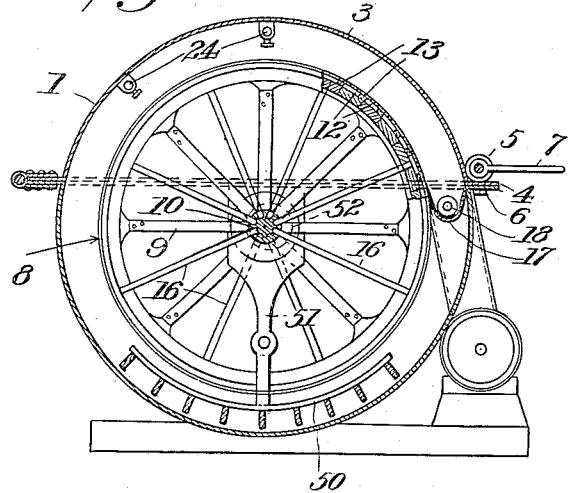
Fig. 3 is a cross-sectional view on the line 3—3 of Fig. 1.
Figure 5:
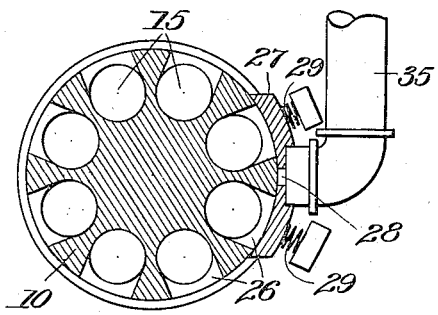
Fig. 5 is an enlarged cross-section of the main-shaft.
Figure 6:
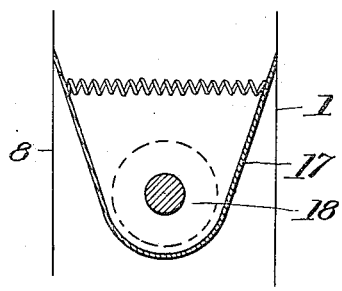
Fig. 6 is an enlarged cross-section of a scraping mechanism.

Within the main shaft or casing above the liquid level thereof, and extending substantially parallel with the shaft, is a trough, 17, of substantial U-shape in cross-section, one edge of said trough being disposed close to or in contact with the periphery of the drum whereby during the rotation of said drum, the solids which accumulate on the surface of the drum will be continuously and progressively removed by the scraping action of the edge of the trough against the periphery of the drum and these solids will be continuously dropped into the trough and from which they may be continuously discharged by means of a suitable conveyer operating in the trough. In the present instance I have shown a conveyer as made of two oppositely-operating and alined screws, 18, which are adapted to move the removed solids right-and-left along the trough to a central discharge opening, 19, communicating with a closed chute, 20, which will in turn deliver these solids to some appropriate form of ejecting mechanism. In Fig. 7, I show a mechanism which may be used for this purpose and which comprises a plunger, 21, operating in a housing, 22, having outlets, 23, the plunger being reduced at its center to form a chamber, 24, into which the solids being delivered through the chute will drop and finally by the reciprocations of the plunger will be carried to one or the other of the final discharge openings, 23, where they may be received into any suitable receptacle, or be otherwise disposed of. Other forms of solid discharging mechanism may be employed, if desired. In my aforesaid companion application I have disclosed the reciprocating plunger and two-part conveyer, and also a modified form of mechanism for the same purpose, and hence I do not claim these specific mechanisms in the present application.

Within the casing and extending lengthwise thereof, or otherwise, are a series of spray pipes, 24, adapted to receive water under pressure and to deliver the same in forcible sprays against the outer surface of the filter cloth or the filtering sides of the drum, whereby the cake-material collecting on the drum, and which cake-material may contain some of the dissolved values in the material being treated, may be washed and the values driven through the filtering surface to the interior filtrate chamber to be finally directed through the pipes, 16, to appropriate channels or passages in the rotary main shaft, 10. These same water pipes, 24, may also be used for admitting currents of air to the outer surface of the drum for the purpose of wholly or partly drying the solids deposited thereon, as will be well understood by those skilled in this art.

An air pipe, 25, is also employed for the purpose of admitting air under pressure to the upper portion of the tank above the fluid level thereof and thereby maintaining in the shell or casing the necessary pressure for driving the filtrate through the drum and into the filter passages before mentioned.

As before stated the hollow shaft, 10, extends substantially the full length of the press. It is provided with the longitudinally extending passages, 15, for the discharge of filtrates, these passages communicating at various points with the interior of the annular filtrate chamber. The shaft is shown as having eight passages and the annular filtrate chamber will be correspondingly entered at a like number of points by the radial pipes, 16, each of which is independent of the others and each connecting with one of the passages through the shaft.

Near the outer end of the shaft, 10, the various filtrate passages connect with transverse outlets, 26, which are made radially through the shaft so that during the rotation of said shaft the filtered liquid, or a wash water, if the washing function is being performed, may be discharged through the lower of said outlets. These various outlets are always open except in the one position where a valve, 27, of suitable construction is designed to close the outlets. It is in this latter position when high pressure compressed air is to be forced to the inside of the annular filtrate chamber for discharging the cake, as I will hereinafter describe. In all other positions the outlets, 26, are open.

The valve, 27, is of such construction that it substantially conforms with the curvature of the shaft and said valve and shaft are designed to slide relatively, and said valve is provided with a slot, 28, through which high-pressure compressed air may be admitted to the passages, 15, and finally to the inside of the annular filtrate chamber, 12'. In practice, the sliding valve, 27, is so arranged that its wear may be taken up by means of suitable springs, 29, or the like.

Reference has heretofore been made to the employment of wash water for spraying the cake-matter on the circumference of the filter drum and during the operation of the machine the liquid filtrate and wash water will discharge through the separate passages, 15, which have outlets through the end of the shaft and also through the radial openings, 26.

By reason of this construction, as the radial openings, 26, reach their lower position, due to the rotation of the central shaft, filtrate will be discharged into a suitable receptacle, 30, and as the shaft continues to rotate and the aforesaid opening rises to the top of the shaft, the wash-water will be delivered straight-way through the proper passages in the shaft and will be discharged through the end ports, 31, controlled by valves, 32, and which valves are always open except in one position, and that is where the valves have been positively closed by some appropriate mechanism during the discharge of the solid or cake-matter. It will be understood that all of the aforesaid eight or other number of openings which are made through the shaft, connect with corresponding radial pipes, 16, and with the interior of the annular filtrate chamber, 12', and each of these passages in the shaft extends beyond the radial openings and through the end of the shaft, and is there controlled by one of the spring-actuated valves, 32, and that these valves are successively operated by some appropriate means, and which means in the present case comprises a cam or curved lifter, 33, Fig. 2, fixed to some stationary part and so positioned within the range of the stems, 34, of the valves that as the shaft rotates, these stems are engaged by the lifter to move them outwardly against the tension of their springs and thus close the valves against the seats of the ports, or outlets, 31, thereby closing the latter. As the valve-stems leave the aforesaid com or lifter, the springs on the stems immediately re-act to again open the longitudinal passage to the shaft by the valve moving away from its seat or port, 31. The result of this construction which is shown in more detail in my aforesaid companion application, is that as the shaft, 10, revolves each radial opening, 26, will allow the filtrate to be discharged when said opening arrives in its lower position, but as the shaft continues to revolve this opening will be carried to a higher level and will not admit of the discharge of the filtrate therefrom, and therefore the filtrate will be continued on its course through the corresponding longitudinal passage and will be discharged at the end of the shaft through its respective valve-controlled port. The ports at the end of the shaft are never closed except as before mentioned; i. e., when blowing high pressure air through a pipe, 35, and the radial ports, 31, the passages, 10, and the pipes, 16, to the inside of the annular filtrate chamber of the drum.

As before stated, the pulp in the main shell or casing is designed to be maintained at a uniform level by some appropriate means. The means which may be used for this purpose may be in the form of an automatic regulator which will start or stop a pulp-supply pump, by breaking an electric contact which is connected with a motor for operating the pump. Such a construction I have illustrated in Fig. 2, where the regulator comprises a casing, 36, having a pulp inlet, 37, connecting with the interior of the shell at a point about where the liquid level is to be maintained, said casing having an interior spider, 38, forming a guide for the stem, 39, of an appropriate float, 40, said stem extending through a guide or stuffing box at the top, of the casing and carrying a contact member, 41, which is designed to coöperate with a second contact, 42, and which contacts are appropriately connected to a pump-motor, not shown, for making and breaking the current as the float rises and falls in response to variations in the level of the pulp in the main casing or shell. By some such way the pulp level in the main casing or shell is kept constant and the operation of the pump is automatically controlled.

To equalize the pressure in the top and bottom of the float chamber I may connect this chamber with an air pipe, 43.

In order that the material admitted to the shell or casing may be kept constantly agitated to effect a better commingling of the fluid and solid portions of the pulp, I prefer to employ in the lower part of the casing between the drum and inner wall of said casing some appropriate form of agitator. One suitable for this purpose may consist of a segmental plate, 50, having ribs on its under surface and serving to stir the pulp and prevent the settlement of solids, said segmental plate being connected to end rockers, 51, which are pivoted between their ends on bearings, 52, Fig. 2, and the upper ends of the rockers being enlarged and having openings adapting them to embrace suitable eccentrics, 53, fixed to the rotatable central main shaft, 10, whereby a rocking movement is imparted to the ribbed plate and the settling of solids on the bottom of the interior of the drum is reduced to a minimum. Any other and appropriate and well known form of agitating means may be substituted for the foregoing without departing from the spirit of my invention.

The operation of the apparatus may be generally stated as follows:

Material to be filtered is pumped into the shell or casing through the inlet pipe, 2, and the level of the liquid in the shell is maintained by the float regulator mechanism, which automatically controls the operation of the pulp supply pump. The filter drum revolves in the shell or casing which is under pressure, which is maintained by means of compressed air supplied through the pipe, 25, and the pressure thus admitted to the casing causes the liquid filtrate to be forced through the filter surface of the drum and finally through the passages, 15, in the central shaft and through the radial outlets, 31, or the valve controlled end ports, 31, substantially as before described. As the drum revolves, the solids which have been formed thereon are washed in the upper portion of the shell by water admitted through the spray pipes, 24, and as said drum further revolves compressed air may be admitted to the shell or casing to partially dry the cake-material and which drying action occurs until the material is brought into contact with the scraping devices. At this point, compressed air at a higher pressure than is contained in the shell or casing is admitted through pipe, 35, and the sliding valve, 27, and which high pressure air passes through the passages in the shaft and into the filter chamber of the drum and by being delivered outwardly through the filtering surface of the drum acts to blow off the adhering cake material and at the same time cleanse these surfaces. The cake material dropping into the before described trough, 17, is finally delivered into the cake-drop or chamber, 24, and then by the pocketed plunger, 21, said material will be automatically discharged from the machine.

A filter of the character described has a continuous operation; rather than an intermittent one, as to its supply of material, filtering function and solids discharge, and it has the added advantage of a maximum filtering capacity per square foot of filter area. In fact, the greater rate of filtration varies as the square of the pressure. In other words, if I double the filter pressure, my rate of filtration increases say four times. Suction filters of the same type are limited in this respect to the amount of vacuum they can produce, while a pressure filter of the present type is limited only by the strength of the shell which incloses the filter agents.

Having thus described my invention what I claim as new and desire to secure by Letters Patent is:—

1. The process herein described of continuously separating a liquid from solids, said process consisting, essentially, in subjecting a solution to be filtered to continuous pressure in the presence of a rotatable filter to thereby separate the liquid filtrate from the solids; continuously removing from the periphery of the filter the separated solids and thereby substantially maintaining the filter efficiency of said filter; and continuously discharging the solids in charges from the filter chamber in a semi-dry condition while maintaining the pressure within the filter chamber.

2. The process herein described of continuously separating a liquid from solids, said process consisting, essentially, in subjecting a solution to be filtered to continuous pressure in the presence of a rotatable filter to thereby separate the liquid filtrate from the solids; carrying said solids into contact with a scraper, to thereby continuously remove said solids and depositing the solids in a semi-dry condition in a receiver and therein maintaining the solids in their semi-dry condition; and discharging said solids without substantially reducing the pressure in the filter chamber.

3. The process herein described of continuously separating a liquid from solids, said process consisting, essentially, in subjecting a solution containing the liquid and solids to continuous pressure in a closed chamber and in the presence of a rotatable filtering agent, to thereby separate the liquid filtrate from the solids; rotating the filtering agent in the solution and simultaneously therewith collecting the solids on the surface of the filtering agent; continuously removing the solids from the surface of said agent and depositing the same in a semi-dry condition in a common receiver; substantially discharging the solids in charges to an exterior point in a semi-dry condition while maintaining the pressure in the filter chamber; and substantially continuously discharging the liquid filtrate at an exterior point different from the point of discharge of the charges of solids.

4. In a filtering apparatus, the combination of a closed shell or casing adapted to form a pressure chamber; means for admitting material to be treated to said chamber; a rotary shaft extending through said chamber, having a hollow filtering member of cylindrical form thereon adapted to rotate in the liquid contents of the shell, said filtering member and shaft having connecting passages for the continuous discharge of liquid filtrate; means within said chamber for continuously removing the solids deposited on the surface of the filtering member, said means comprising a collecting trough having a scraping edge against which the solids are carried, said trough having a conveyer extending parallel with the axis of said shaft, and means for continuously discharging the solids in charges in a semi-dry form from the said trough.

In testimony whereof I affix my signature.

JASPER A. McCASKELL.